United States Patent [19]

Warren et al.

[11] 4,020,513
[45] May 3, 1977

[54] COMBINATION LUGGAGE CARRIER AND PICNIC TABLE FOR USE WITH ROWBOATS

[75] Inventors: McCoy Warren; Alfreda C. Warren, both of San Francisco, Calif.

[73] Assignee: The Raymond Lee Organization, Inc., a part interest

[22] Filed: July 26, 1976

[21] Appl. No.: 708,844

[52] U.S. Cl. .................... 9/1.5; 49/465; 224/42.1 E; 296/23 B
[51] Int. Cl.² ........................ B63B 17/00
[58] Field of Search ......... 9/1.1, 1.2, 1.5, 6 R; 296/23 B; 224/42.1 E, 42.01; 49/465; 135/6

[56] References Cited

UNITED STATES PATENTS

| 3,045,262 | 7/1962 | Mitchell | 9/1.1 |
| 3,095,129 | 6/1963 | Kerr | 224/42.1 E |
| 3,301,449 | 1/1967 | Tope | 224/42.01 |
| 3,357,031 | 12/1967 | Edwards | 9/1.1 |
| 3,473,839 | 10/1969 | Elble | 9/1.1 X |
| 3,684,139 | 8/1972 | Johnson | 224/42.1 E X |

*Primary Examiner*—Trygve M. Blix
*Assistant Examiner*—Douglas C. Butler

[57] ABSTRACT

Two flat panels, each a mirror image of the other, are located in a rowboat so as to cover the major portion of the open top of the boat. The panels are hinged so as to allow either one to be folded on top of the other. A set of legs is associated with each panel. The legs are hinged to the panels, so as to enable the legs to serve as standards for the panels to form a picnic table, or to enable the legs to lie flat on the panels. A locking device can extend through holes in the legs, the panels and the rowboat to secure everything together.

3 Claims, 7 Drawing Figures

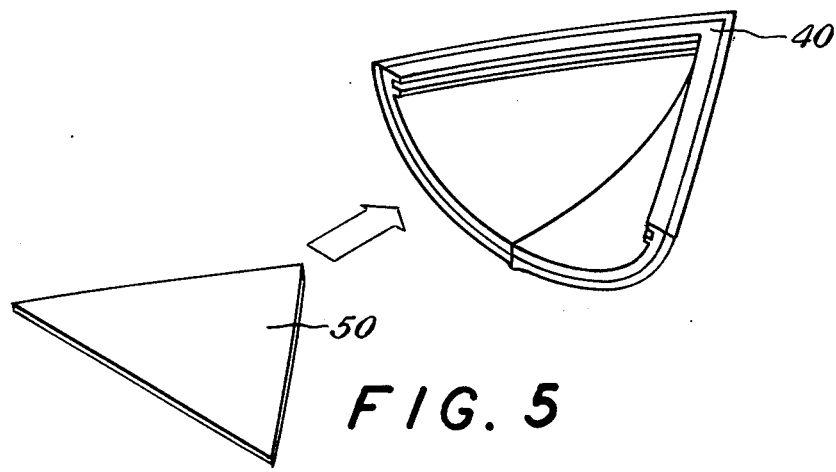
FIG. 5
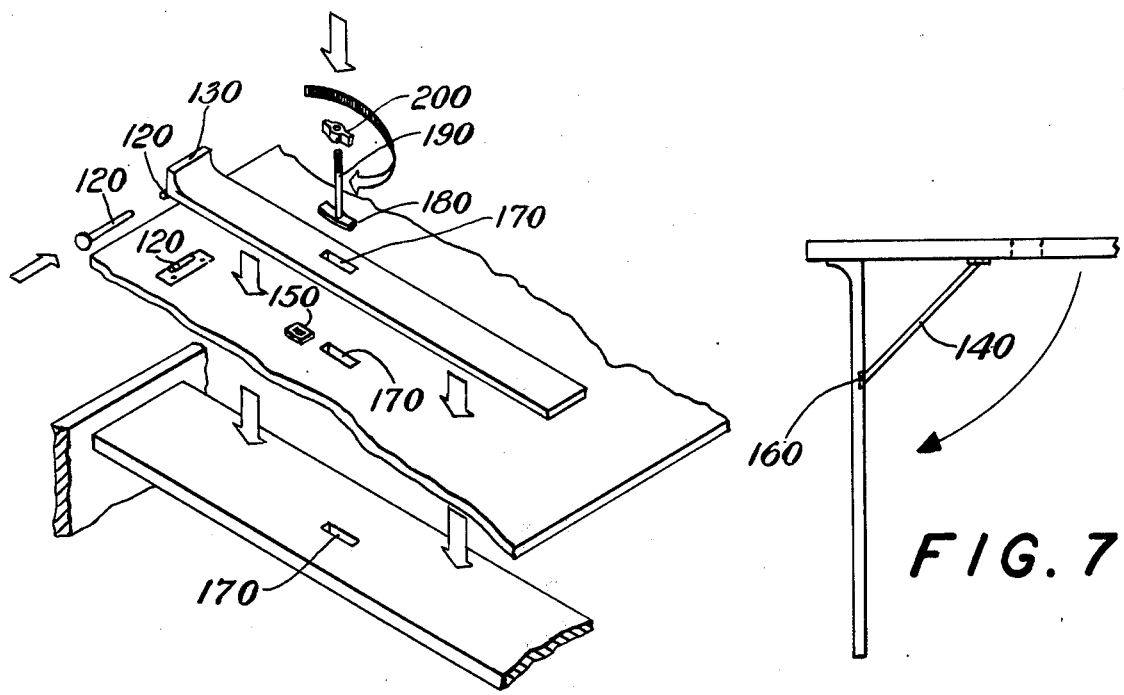
FIG. 6
FIG. 7

COMBINATION LUGGAGE CARRIER AND PICNIC TABLE FOR USE WITH ROWBOATS

SUMMARY OF THE INVENTION

This invention is designed for use with a rowboat that has seats into which holes have been placed. When used with the rowboat, the invention covers the open top of the rowboat and allows the boat to be used in an inverted position as a luggage carriage atop an automobile or the like. When the invention is taken out of the rowboat, the invention can be set up to form a picnic table. Thus, the invention is useful in family outings and similar functions.

BRIEF DESCRIPTION OF THE DRAWINGS

FIG. 5 shows a device usable with the invention.
FIG. 6 shows how the invention can be secured to the rowboat.
FIG. 7 shows how the legs of the invention can be braced.

DETAILED DESCRIPTION OF PREFERRED EMBODIMENTS

Figure 1:
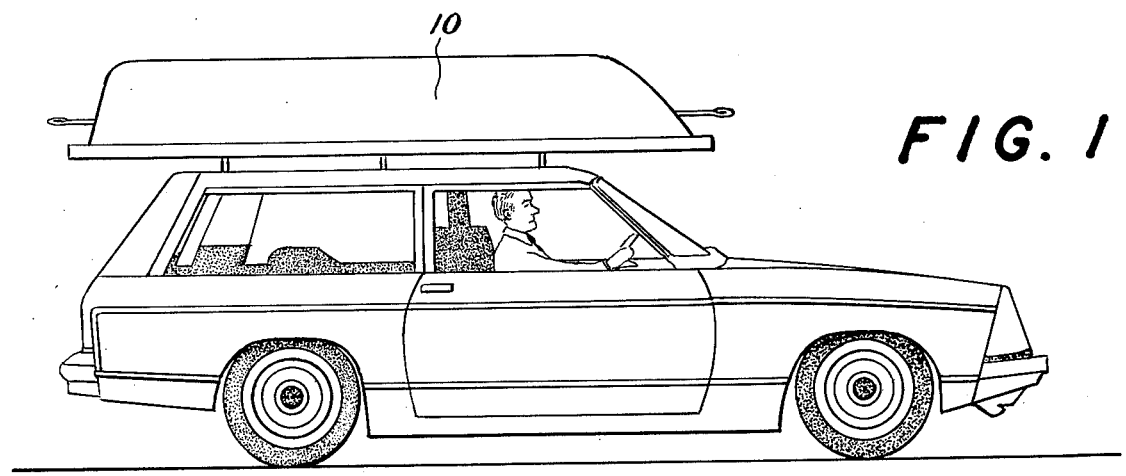
FIG. 1 shows the invention in use as a luggage carrier.
Figure 2:
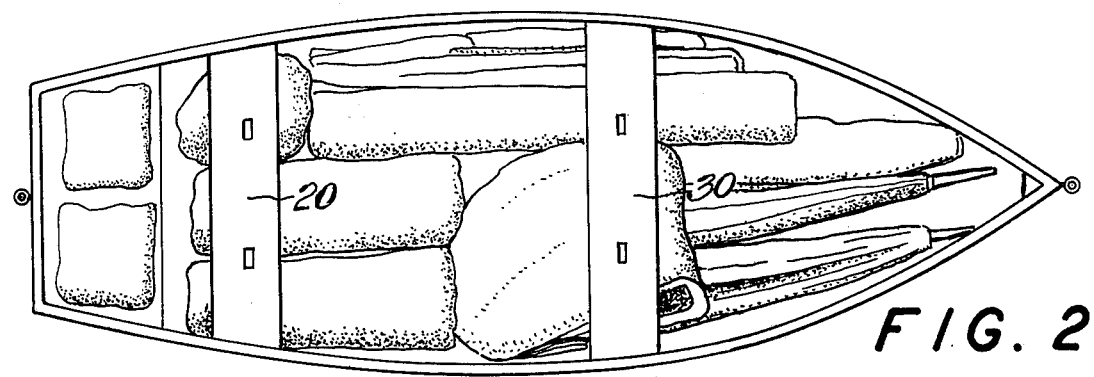
FIG. 2 shows a rowboat loaded with luggage.
Figure 3:
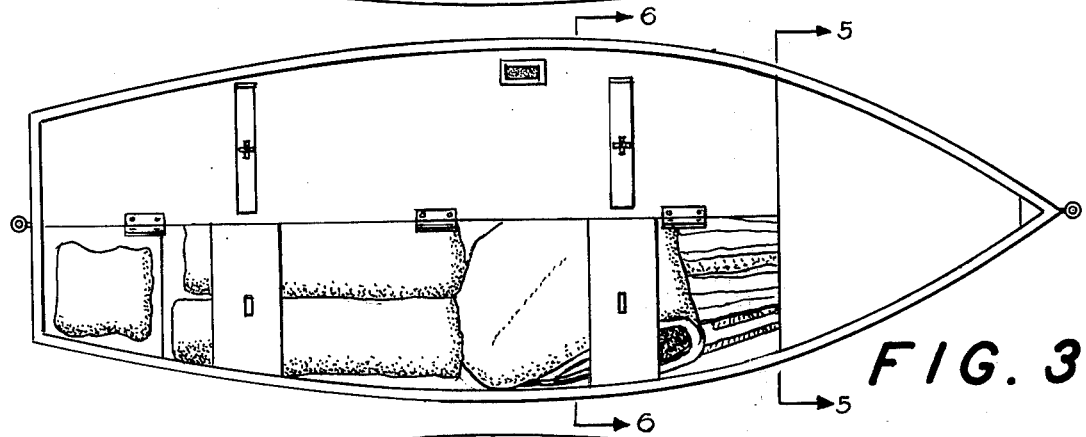
FIG. 3 and 4 show how the invention is installed in a rowboat.
Figure 4:
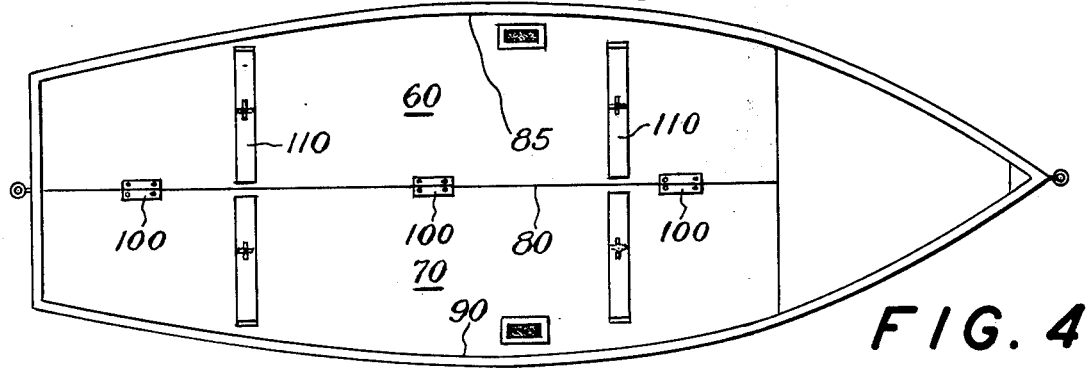

A rowboat 10 has two seats 20 and 30 extending transversely below its open top. A V-shaped grooved member 40 is located in the prow of the boat, at the top, to receive a triangular plate 50 which will cover the forwardmost portion of the top.

The rest of the top, being the major portion thereof, is covered by two panels 60 and 70. These panels are mirror images of each other, and the line 80 between them is directly above and parallel to the central longitudinal axis of the boat. The front and rear edges of the panels are straight, but edge 85 on panel 60 and edge 90 on panel 70 are outwardly curved, so as to completely cover the top of the boat and not leave any open gaps at the sides.

Hinges 100 are attached between the panels, and are located on the tops of the panels. Thus, one of the panels can be lifted up to allow access to the interior of the boat, without disturbing the other panel.

Two sets of legs, each including two legs 110, are utilized with the panels, with each set being attached to a corresponding panel. Each let 110 is located transversely across the boat, directly above one-half of a corresponding seat. At the outer end of each leg is a hinge 120, one part of which is located on a flat shelf 130 extending vertically upwardly from the outer end of the leg. It can be seen that each of the legs can be pivoted about its corresponding hinge 120 so as to extend vertically upwardly from the panel to which it is attached, and the leg, when pivoted, will rest upon the shelf, which will prevent the leg from overshooting the vertical. In order to brace the legs in the position to which they have been pivoted, an elongated brace rod 140 is used. This rod fits between a corresponding well 150 in the panel and another well 160 in the leg.

Holes 170 are located in the seats, the panels, and in each of the legs. The holes are rectangular, and the hole in each leg is aligned with corresponding holes in the panel and the seat. A T-shaped hook with a bowed rectangular crosspiece 180 and a threaded rod 190 extending upwardly from the center of the crosspiece can fit through the holes in the leg, panel and seat, and then rotated through 90°. Tapped handle 200 can then be threaded onto the rod, to lock the leg and the panel to the seat. As is shown in figures, four of these handle-and-hook assemblies are used to secure the invention to the rowboat.

In use, the rowboat can be packed with luggage, and plate 50 installed. Because the panels, when installed, abut the plate, the plate cannot become dislodged by rearward movement out of the groove. The plate are then placed on top of the seats and the legs and panels secured to the boat by the hooks and the handles. The boat may then be inverted, placed on top of an automobile, and carried to a camping site. Once at the site, the panels and plate can be detached from the boat to allow access to its contents. The legs can, if desired, be propped up to vertical positions by means of the brace rods. The panels can then be inverted, and rested upon the legs, to form a picnic table.

We claim:

1. A device for use with rowboats and the like which have seats into which holes have been placed, comprising:

two flat, horizontally elongated panels, each having a plurality of holes which panels are mirror images of each other and which panels have three straight edges and one outwardly curved edge, the panels being so shaped that when they are placed side by side next to each other inside a rowboat on top of the seats a flat surface will be formed which completely covers the major portion of the open top of the boat, said surface having a straight forward edge that extends transversely across the boat, with the line separating the two panels lying above the central longitudinal axis of the boat, and with the holes in the panels being aligned with the holes in the seats;

a plurality of first hinges hingedly connecting the panels together so as to enable one panel to be folded on top of the other, the first hinges being located on the tops of the panels;

two like sets of like straight elongated legs, each leg having a hole approximately midway between its ends;

two like sets of like second hinges, set of second hinges connecting a corresponding set of legs to a corresponding panel, with each second hinge securing the outer end of a corresponding leg to the panel in a manner that the leg normally extends transversely across the panel with the hole in the leg being aligned with a corresponding hole in the panel and that the leg can be pivoted about its outer end to a vertical position perpendicular to the plane of the panel;

brace means cooperating with the legs and panels to brace the legs in vertical positions once the legs have been pivoted thereto; and lock means removably locatable in the holes in the legs, panels and seats to detachable secure the legs, panels and seats together.

2. The device of claim 1 wherein each leg has a flat upwardly extending shelf located at its outer end.

3. The device of claim 2 further including a handle on each panel.

* * * * *